(12) United States Patent
Chasen

(10) Patent No.: US 6,337,466 B1
(45) Date of Patent: Jan. 8, 2002

(54) TOASTER OVEN WITH LOWERED SUPPORT RACK AND REFLECTOR DIFFUSER

(75) Inventor: James E. Chasen, West Haven, CT (US)

(73) Assignee: HP Intellectual Corp., Wilmington, DE (US)

(*) Notice: Subject to any disclaimer, the term of this patent is extended or adjusted under 35 U.S.C. 154(b) by 0 days.

(21) Appl. No.: 09/551,815

(22) Filed: Apr. 18, 2000

(51) Int. Cl.[7] ............................. A47J 37/04; A21B 1/22; F24L 15/16
(52) U.S. Cl. ..................... 219/405; 219/411; 392/425; 99/392; 126/339
(58) Field of Search ................................. 219/405, 411, 219/391; 126/337 A, 337 R, 339, 273 R, 275 E; 99/385, 389, 391, 392, 393, 399, 447; 392/423, 425

(56) References Cited

U.S. PATENT DOCUMENTS

| | | | |
|---|---|---|---|
| 1,045,296 A | 11/1912 | Jeavons | |
| 1,563,823 A | 12/1925 | Anderson | |
| 2,123,359 A | 7/1938 | Hallmark | 53/6 |
| 2,214,630 A | 9/1940 | Wheeler | 219/35 |
| 2,722,883 A | 11/1955 | Rignell | 99/447 |
| 3,152,242 A * | 10/1964 | de Mott | 392/423 |
| 3,334,620 A | 8/1967 | De Werth | 126/41 |
| 3,586,518 A | 6/1971 | Folmar | 99/259 |
| 3,693,538 A | 9/1972 | Synder | 99/447 |
| 3,977,389 A * | 8/1976 | Ondrasik, II | 126/337 R |
| 4,761,529 A | 8/1988 | Tsisios | 219/10.55 |
| 5,277,106 A | 1/1994 | Raymer et al. | 99/447 |
| 5,355,868 A | 10/1994 | Haen | 126/41 |
| 5,390,588 A | 2/1995 | Krasznai et al. | 99/389 |
| 5,471,914 A | 12/1995 | Krasznai et al. | 99/389 |
| 5,546,853 A | 8/1996 | Hail et al. | 99/447 |
| 5,782,230 A | 7/1998 | Linnebur et al. | 126/41 |
| 5,878,739 A | 3/1999 | Guidry | 126/25 |
| D420,245 S * | 2/2000 | De'Longhi | D7/351 |
| 6,188,836 B1 * | 2/2001 | Glucksman et al. | 392/423 |

OTHER PUBLICATIONS

Household Products, Inc. (Black & Decker) 1999–2000 Catalog, pp. 7–10.

* cited by examiner

Primary Examiner—Joseph Pelham
(74) Attorney, Agent, or Firm—Barry E. Deutsch

(57) ABSTRACT

An electric toaster oven having a housing, a heating element connected to the housing, a reflector connected to the housing, and an object supporting rack connected to the housing and forming an article receiving area between the rack and the housing for receiving an article to be heated. The rack has a stepped profile with raised side sections connected to the housing and a lower main section. A lower area of the article receiving area is defined by a top of the lower main section. The reflector has a generally inverted V shaped side profile with a generally concave area facing the heating element.

12 Claims, 3 Drawing Sheets

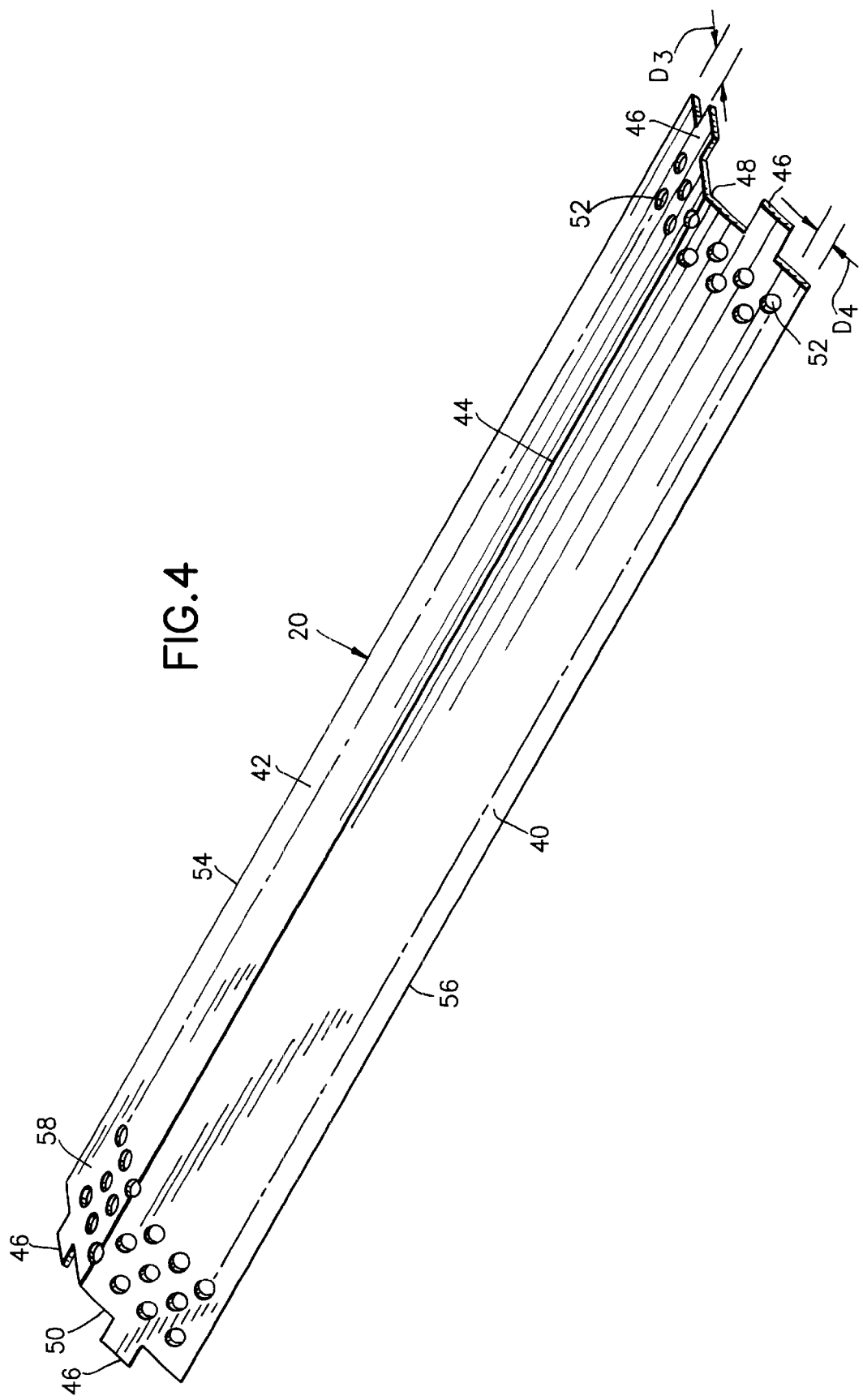

TOASTER OVEN WITH LOWERED SUPPORT RACK AND REFLECTOR DIFFUSER

BACKGROUND OF THE INVENTION

1. Field of the Invention

The present invention relates to electric appliances and, more particularly, to a toaster oven.

2. Prior Art

U.S. Pat. No 3,693,538 discloses an electric toaster oven having a slotted baffle member located above two bottom calrods. Toaster ovens are currently sold with inner liners having lateral side grooves which slideably support article support racks which have flat profiles. It is desired to increase the article receiving area of a toaster oven without increasing the size of the toaster oven or redesigning a housing of the toaster oven.

SUMMARY OF THE INVENTION

In accordance with one embodiment of the present invention, an electric toaster oven is provided having a housing, a heating element connected to the housing, and an object supporting rack connected to the housing and forming an article receiving area between the rack and the housing for receiving an article to be heated. The rack has a stepped profile with raised side sections connected to the housing and a lower main section. A lower area of the article receiving area is defined by a top of the lower main section.

In accordance with another embodiment of the present invention, an electric toaster oven is provided having a housing, an elongate heating element connected to the housing in a bottom of a heating area of the housing, an article supporting rack connected to the housing above the heating element, and an elongate diffuser located between the heating element and the rack. The diffuser has a generally inverted V shape side profile with a generally concave area facing the heating element.

In accordance with another embodiment of the present invention, an electric toaster oven is provided comprising a housing; an elongate element connected to the housing at a bottom of a heating area of the housing; an article supporting rack connected to the housing above the heating element; and an elongate reflector connected to the housing between the heating element and a lower main section of the rack. The rack has a general stepped profile forming the lower main section. The reflector has a generally concave shaped lower side which faces the heating element.

BRIEF DESCRIPTION OF THE DRAWINGS

The foregoing aspects and other features of the present invention are explained in the following description, taken in connection with the accompanying drawings, wherein:

FIG. 4 is a perspective view of the reflector used in the toaster oven shown in FIG. 1.

DETAILED DESCRIPTION OF THE PREFERRED EMBODIMENT

Figure 1:
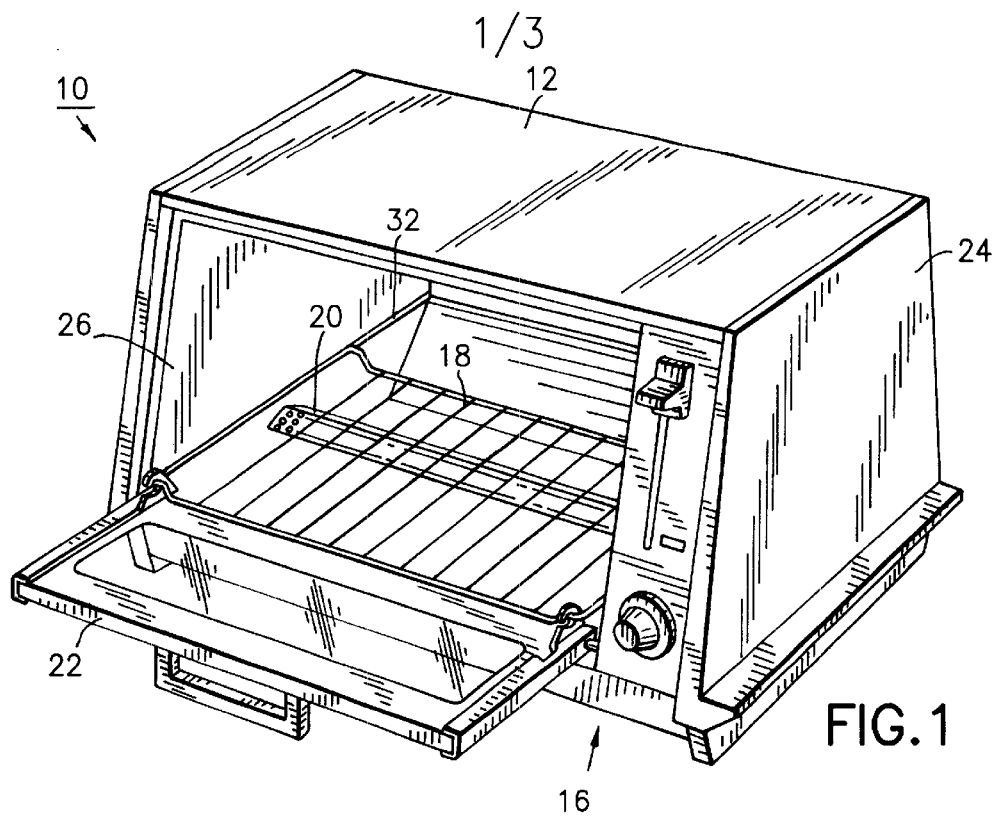
FIG. 1 is a perspective view of a toaster oven incorporating features of the present invention.

Referring to FIG. 1, there is shown a perspective view of an electric toaster oven 10 incorporating features of the present invention. Although the present invention will be described with reference to the single embodiment shown in the drawings, it should be understood that the present invention can be embodied in many alternate forms of embodiments. In addition, any suitable size, shape or type of elements or materials could be used.

Figure 2:
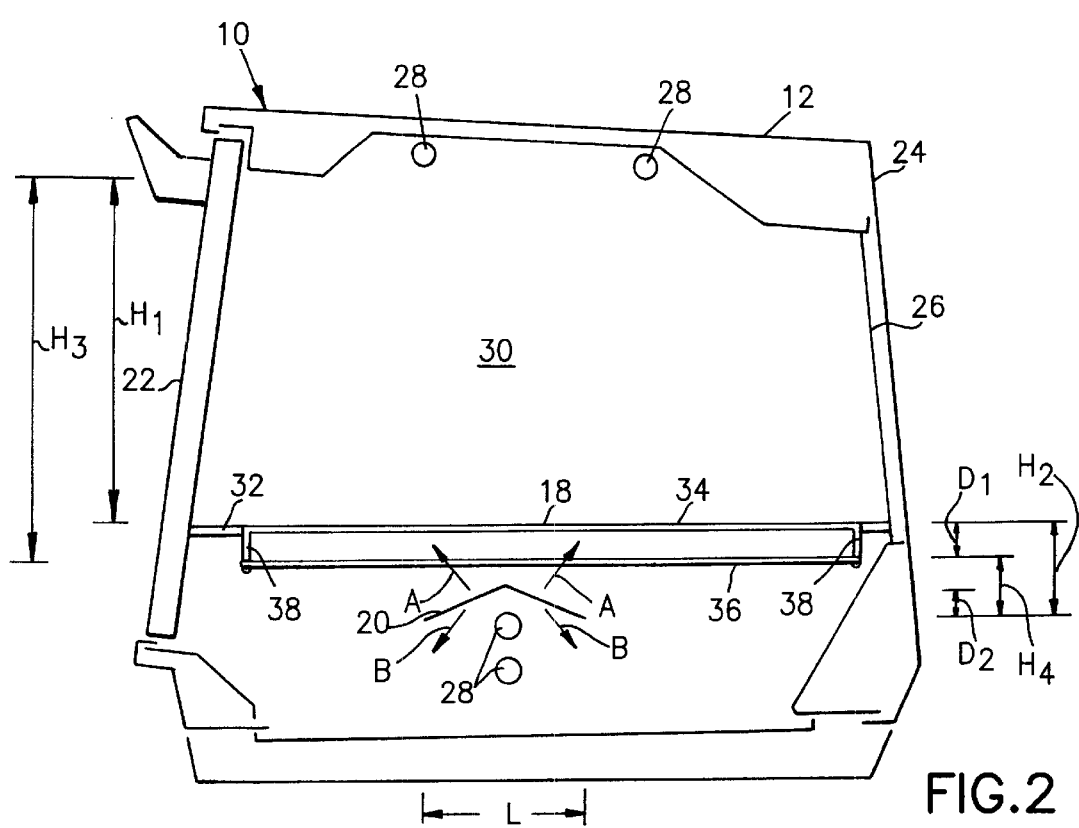
FIG. 2 is a schematic cross-sectional view of the toaster oven shown in FIG. 1.

Referring also to FIG. 2, the toaster over 10 generally comprises a housing 12, heating elements 28, a user actuated control 16, an article supporting rack 18, and a reflector or diffuser 20. The housing 12 generally comprises a door 22, an exterior shell 24, an interior liner 26 and a removable crumb tray (not shown). The interior liner 26 is preferably the same as the interior liner used in the Black & Decker® TOAST-R-OVEN™ broilers; models TRO400, TRO500 and TRO600 except for the addition of additional mounting holes for reflector 20. However, any suitable housing could be provided. Liner 26 includes slots 32 (only one of which is shown) in lateral sides of liner 26 for slidably receiving sides of rack 18. Heating elements 28 and user actuated control 16 are preferably the same as heating elements and user actuated controls on models TRO400, TRO500 or TRO600. However, any suitable heating elements and user actuated control could be provided. In this embodiment, the heating elements include four elongate calrods 28 extending between the lateral sides of liner 26; two at the top of the heating area 30 defined by liner 26 and the door 22, and two at the bottom of the heating area 30.

Figure 3:
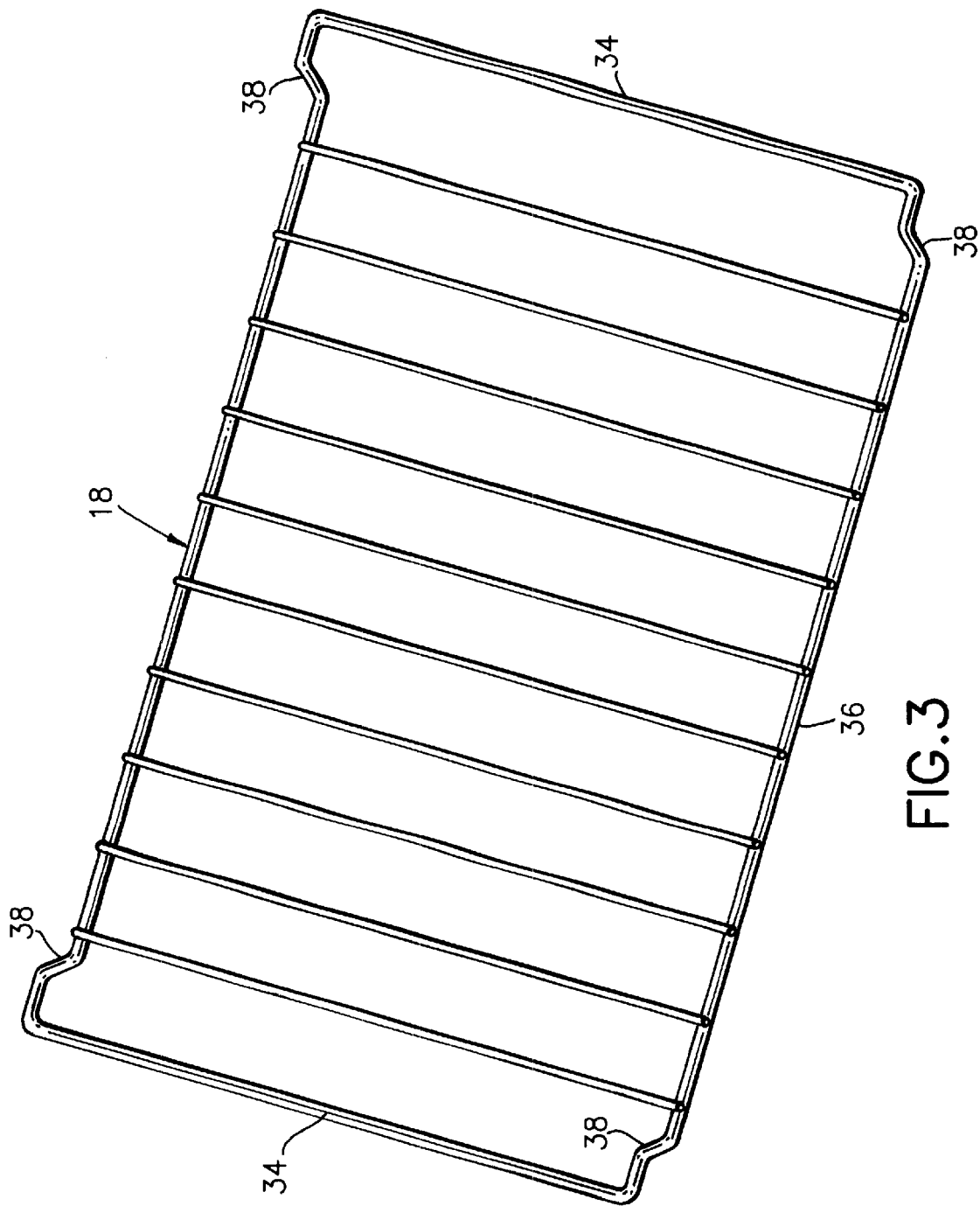
FIG. 3 is a perspective view of the article support rack of the toaster oven shown in FIG. 1.

Referring also to FIG. 3, rack 18 is different from the rack presently used in each of the models TRO400, TRO500 and TRO600 toaster ovens. More specifically, the racks used in the prior art have a substantially flat elevational side profile establishing a bottom of an article receiving area across the two slots 32; the article receiving area having a height $H_1$ in the prior art. Thus, the prior art flat profile rack provided a height $H_2$ between the bottom calrods 28 and the top of the prior art rack. The rack 18 in the embodiment shown has a stepped profile. More specifically the rack 18 comprises two upper side sections 34 and a lower main section 36. Step transitions 38 extend between sections 34, 36. The upper side sections 34 are slidingly received in slots 32. Because of the step transitions 38, however, the lower main section is lower than the slots 23 by a distance $D_1$. In a preferred embodiment $D_1$ is about 0.33 inch. However, any suitable distances could be provided. This provides an increased height $H_3$ of the article receiving area; $H_3$ being larger than the prior art article receiving area height $H_1$. Thus, with the stepped profile rack 18 toaster oven 10 can receive larger food containers than the prior art while still using the same size liner 26 as used in the prior art. In an alternate embodiment rack 18 could be configured to be used with any suitably sized and shaped liners.

Because the top surface of rack 18 is closer to the bottom calrods 28 than in the prior art ($H_4 < H_2$), a potential problem existed if a conventional heat diffuser was to be used; uneven toasting could occur. A bottom side of an article being toasted could be burned at its center near the bottom calrods; the article being closer to the bottom calrods than in the prior art. A top side of the article might not be sufficiently toasted; the article being further away from the top calrods than in the prior art. In order to correct for this potential problem the toaster oven 10 does not use a conventional heat diffuser. Instead, toaster oven 10 can be provided with reflector 20 as shown in FIG. 4.

Reflector 20 is preferably a one piece elongate member comprised of a suitable stock material, such as sheet metal, and preferably having a reflective finish such as Galvalum or Chrome. Reflector 20 has a generally cross-sectional inverted V shape or teepee shape. However, any suitable shape having a generally concave bottom surface could be provided. The generally inverted V shape has a front leg 40, a rear leg 42, and an apex 44. The two legs 40, 42 are angled relative to each other at an angle of about 155°. However, any suitable angle could be provided. The legs 40, 42 also have a same length outward from the apex 44, but different lengths could be provided. The length L of reflector 20 (see FIG. 2) is preferably about twice the length of a conventional diffuser as used in the model TRO series of toaster ovens described above. Reflector 20 includes tabs 46 at its lateral sides 48, 50. The tabs 46 are inserted into mounting holes in liner 26 to attach reflector 20 to the liner. However, any suitable means could be used to attach reflector 20 to the liner. In a preferred embodiment the distances $D_2$ between the top of reflector 20 and upper bottom calrod 28 is the same as in the prior art TRO toaster ovens. However, any suitable spacing distances $D_2$ could be provided. Reflector 20 also includes holes 52. Holes 52 are provided to allow some of the energy from the bottom calrods to pass through reflector 20. In this embodiment the front leg 40 comprises more holes 52 than the rear leg 42. In addition, holes 52 are located at a distance $D_3$ which is farther away from the rear edge 54 on rear leg 42 than a distance $D_4$ that the holes 52 are located on the front leg 40 from the front edge 56. In a preferred embodiment $D_3$ is about three times greater than $D_4$. However, any suitable spacing or distances could be provided. Thus, rear leg 42 has a section 58 at the rear edge 54 which does not have holes 52. It has been found that, because of the elongated length of reflector 20, the shape of reflector 20, the heat losses through door 22, and the shape of liner 26, section 58 without holes reflects energy downward sufficiently to prevent uneven toasting from front to rear. If holes 52 were provided at section 58 an article could be more darkly toasted at the rear of area 30 than at the front of area 30. In alternate embodiments any suitable hole pattern could be provided.

The shape of reflector 20 also provides another advantage. In particular, the general inverted V shape of reflector 20 is more structurally rigid than in the prior art diffuser. This increased structural rigidity is provided even though the front to rear length L of reflector 20 is larger than in the prior art. This structural rigidity is beneficial because the bottom calrods 28 can get red hot, and it is desirable that reflector 20 not bend from this heat. In addition, the reflector 20 can be contacted by a user during cleaning. The increased structural rigidity can help prevent reflector 20 from being inadvertently bent or damaged during cleaning.

Referring back to FIG. 2, because main section 36 of rack 18 has been moved closer to the bottom calrods 28 ($H_4$ is less than $H_2$) in order to increase the height $H_3$ of the article receiving area from the prior art height $H_1$, reflector 20 is provided to prevent uneven toasting of an article. To accomplish this reflector 20 allows some energy through holes 52, as indicated by arrows A, but reflector 20 is shaped to reflect energy downward as indicated by arrows B. It has been found that merely reflecting energy outward can still result in uneven toasting. This is because heat has a tendency to rise. Thus, for a reflector that merely reflected energy outward, heat would quickly travel upward just past edges of such a reflector. Reflector 20 has been configured to reflect energy downward and as well as outward. Since heat has a tendency to rise, by reflecting energy both downward and outward a good portion of the reflected energy is directed towards the front and rear of the heating area before it passes above rack 18. This allows a good portion of the reflected energy to travel past rack 18 at the front and rear of the rack. This causes a more even top/bottom heating or toasting of an article on rack 18; even though the article is closer to the bottom calrods than in the prior art. Thus, the present invention can provide good toasting with a larger article receiving area than in the prior art, but within the same size heating area 30 defined by liner 26 and door 22 as in the prior art. A toaster oven comprising features of the present invention can use the same liner as in the prior art with the same slots 32 and the same bottom calrod placement, but merely having mounting holes added to the liner for mounting tabs 46. There is no need to redesign the liner or enlarge heating area 30 to provide a larger article receiving area. In an alternate embodiment, reflector 20 could be used with any suitable tray or rack; not just rack 18. For example, if the toaster oven liner is provided with the rack mounting slots located in a lower position than the slots 32, reflector 20 could be used in a toaster oven having a prior art non-stepped rack.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. In an electric toaster oven having a housing, a heating element connected to the housing, and an object supporting rack connected to the housing and forming an article receiving area between the rack and the housing for receiving an article to be heated, wherein the improvement comprises:
   the rack having a stepped profile with raised side sections connected to the housing and a lower main section, a lower area of the article receiving area being defined by a top of the lower main section, and
   a reflector between the heating element and the rack, said reflector comprising a generally cross-sectional inverted V shape.

2. A toaster oven as in claim 1 wherein the housing comprises slots which the side sections are slidably located in.

3. A toaster oven as in claim 1 wherein the reflector comprises holes therethrough, and wherein a rear portion of the inverted V shape has less holes than a front portion of the inverted V shape.

4. A toaster oven as in claim 3 wherein the holes through the rear portion are spaced a larger distance from a rear edge of the reflector than the holes through the front portion are spaced from a front edge of the reflector.

5. A toaster oven as in claim 1 wherein the reflector comprises a concave bottom surface which faces the heating element.

6. In an electric toaster oven having a housing, an elongate heating element connected to the housing in a bottom of a heating area of the housing, an article supporting rack connected to the housing above the heating element, and an elongate diffuser located between the heating element and the rack, wherein the improvement comprises:
   the diffuser having a generally inverted V shape side profile with a generally concave area facing the heating element.

7. A toaster oven as in claim 6 wherein the diffuser comprises holes, and wherein a front leg of the generally V shape comprises more holes than a rear leg of the generally V shape.

8. A toaster oven as in claim 6 wherein the diffuser comprises holes, and wherein the holes through a rear leg of the generally V shape are spaced a larger distance from a rear edge of the diffuser than the holes through a front leg of the generally V shape are spaced from a front edge of the diffuser.

9. A toaster oven as in claim 6 wherein the rack comprises lateral sides connected to the housing at a first height from the heating element and a main section at a second lower height from the heating element.

10. An electric toaster oven comprising:

a housing;

an elongate element connected to the housing at a bottom of a heating area of the housing;

an article supporting rack connected to the housing above the heating element, the rack having a general stepped profile with a lower main section; and an elongate reflector connected to the housing between the heating element and the lower main section of the rack, the reflector having a generally concave shaped lower side which faces the heating element, the reflector including a plurality of holes therethrough, the holes are located closer to a front edge of the reflector than to a rear edge of the reflector.

11. A toaster oven as in claim 10 wherein the rack comprises side sections connected to the housing, and wherein the lower main section is located closer to the heating element than the side sections.

12. A toaster oven as in claim 10 wherein the reflector comprises a generally inverted V shape profile.

* * * * *